Dec. 10, 1929.  C. W. MUELLER  1,739,081
BLINDSTITCH SEWING MACHINE
Filed Oct. 15, 1927  6 Sheets-Sheet 1
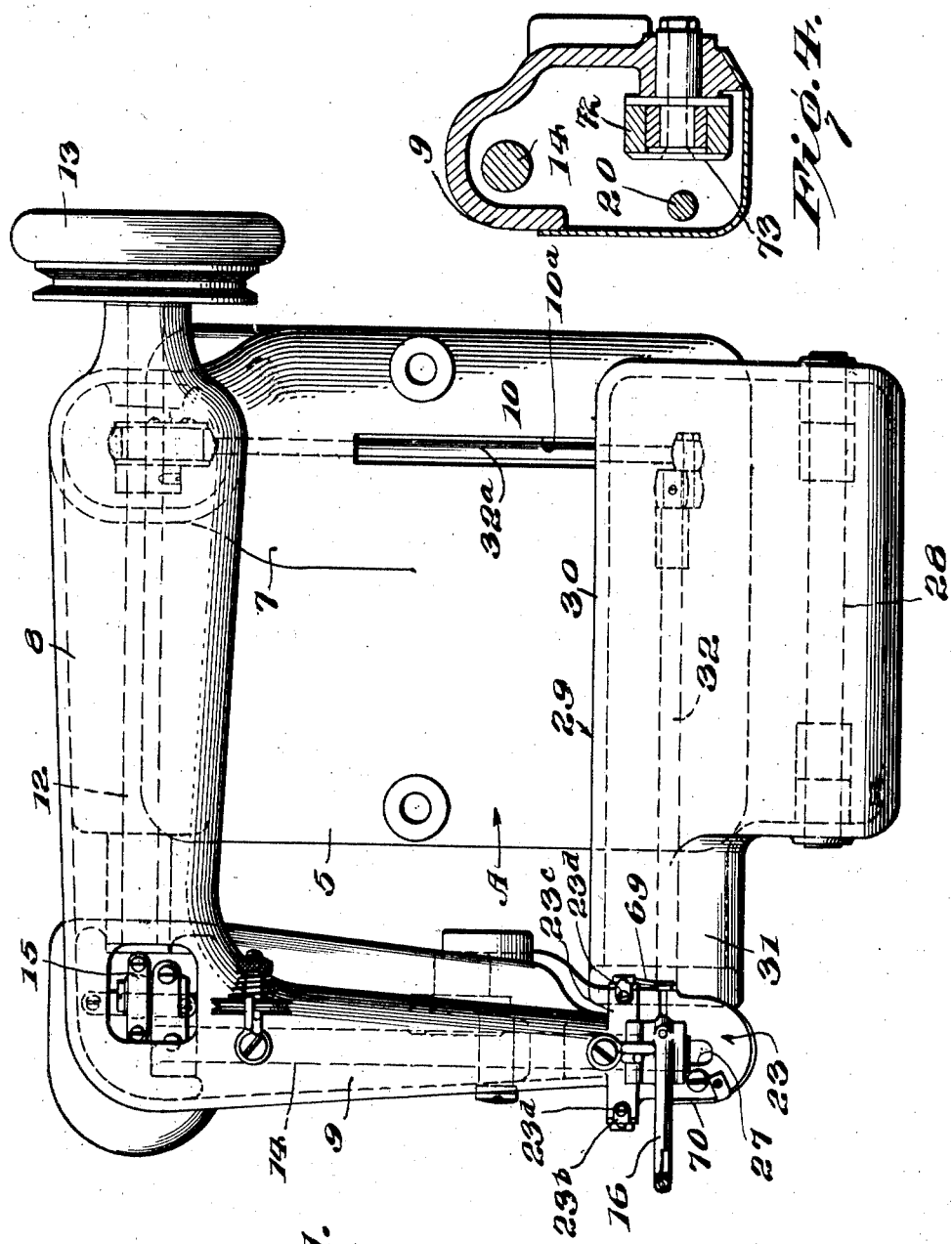

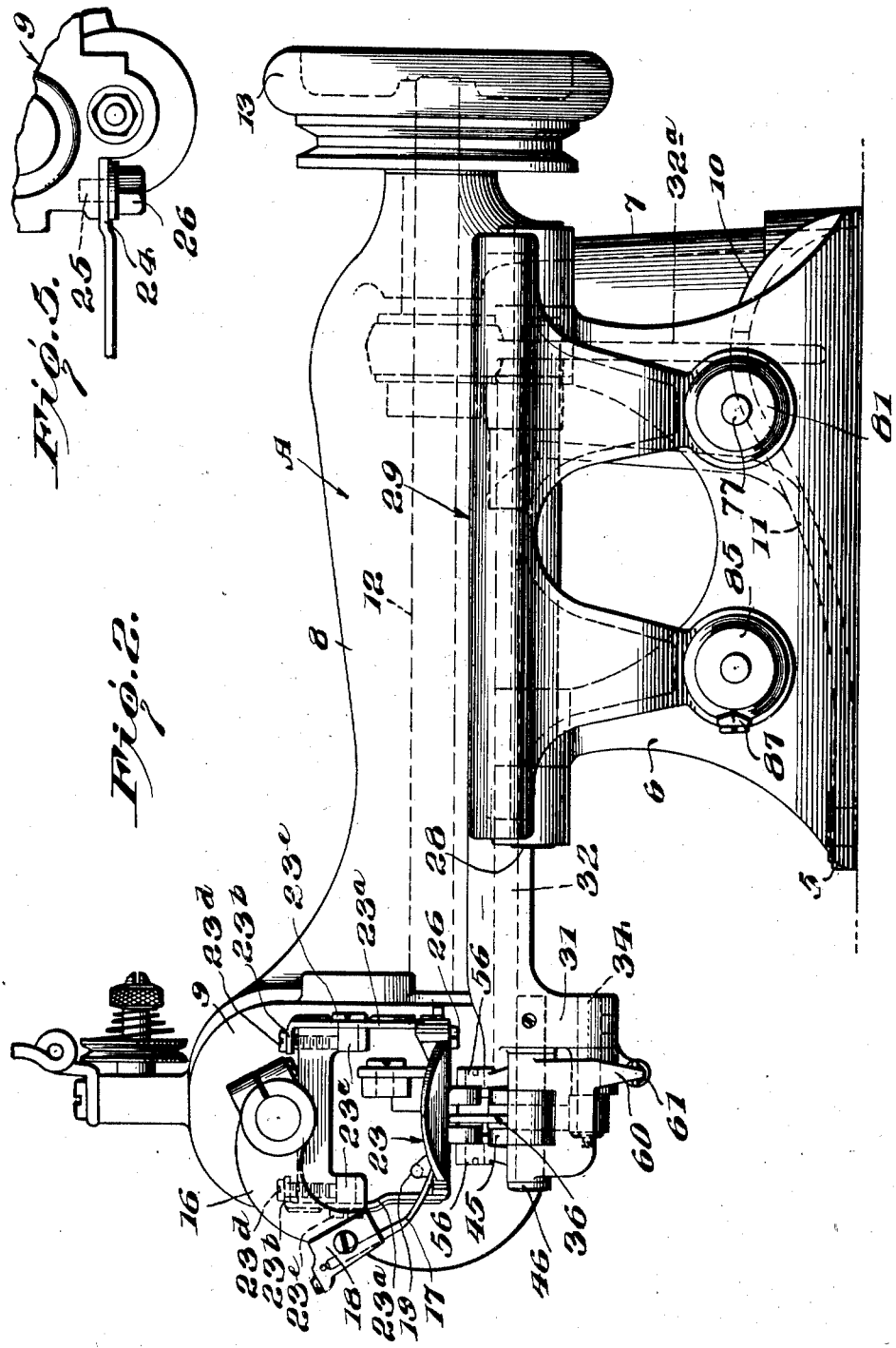

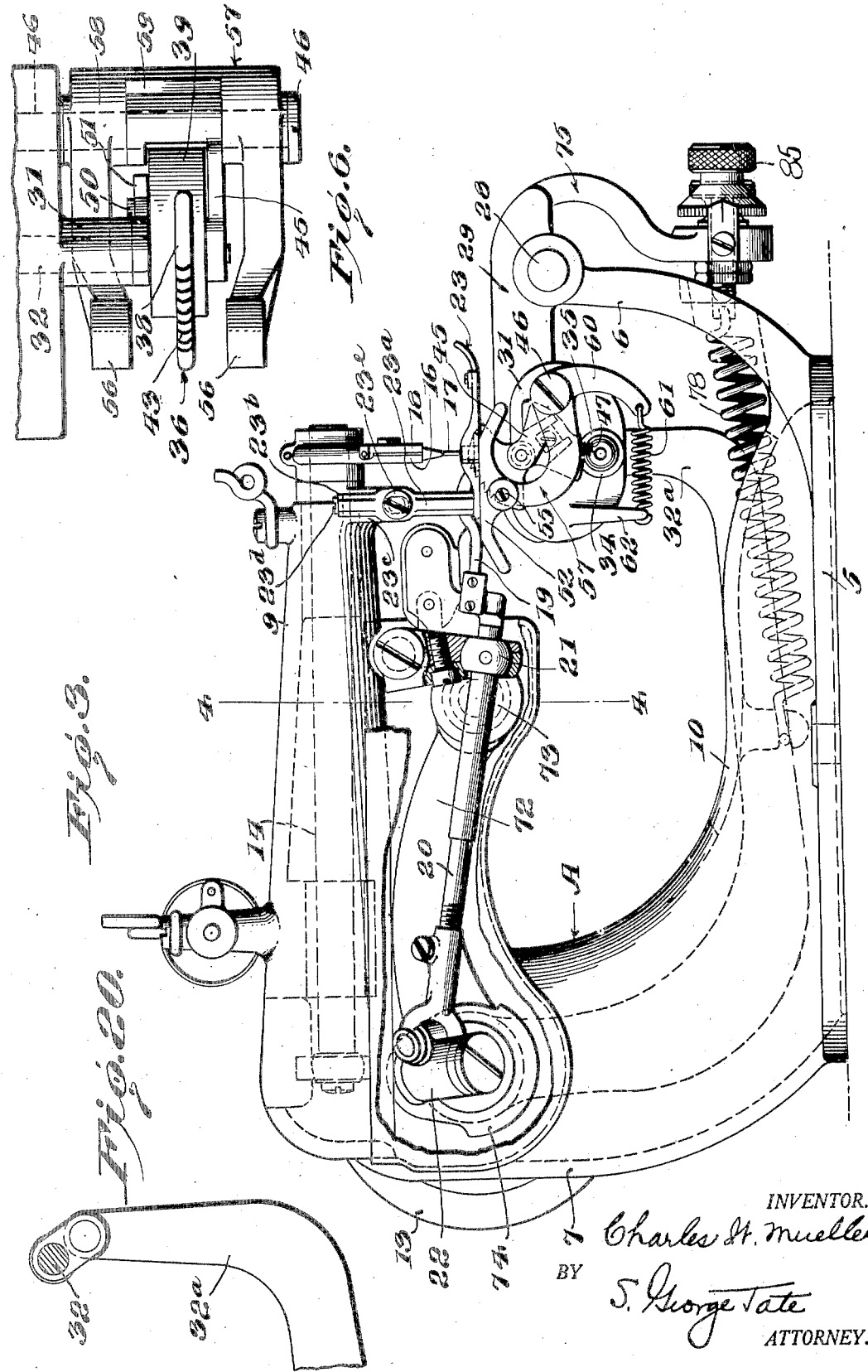

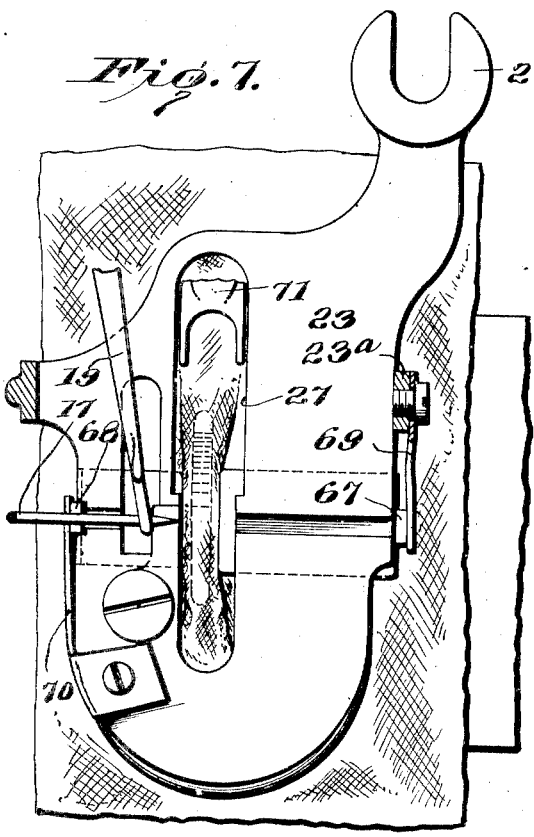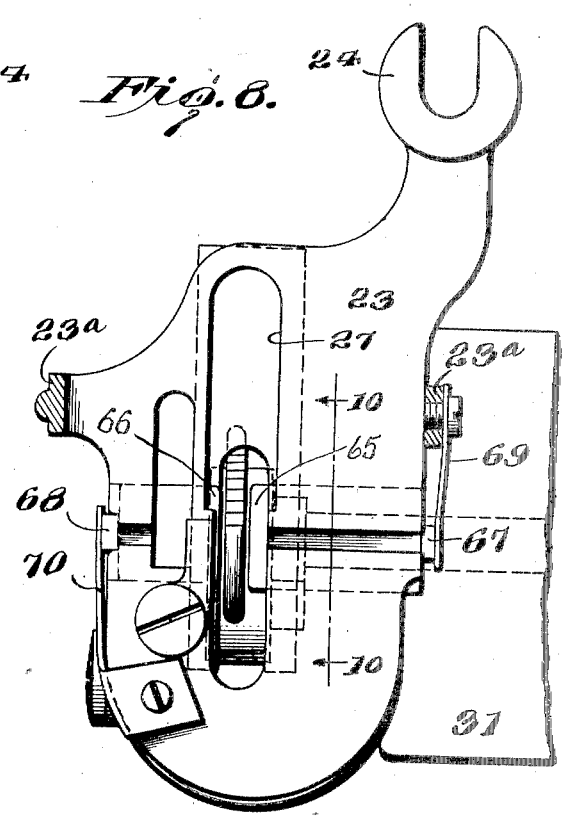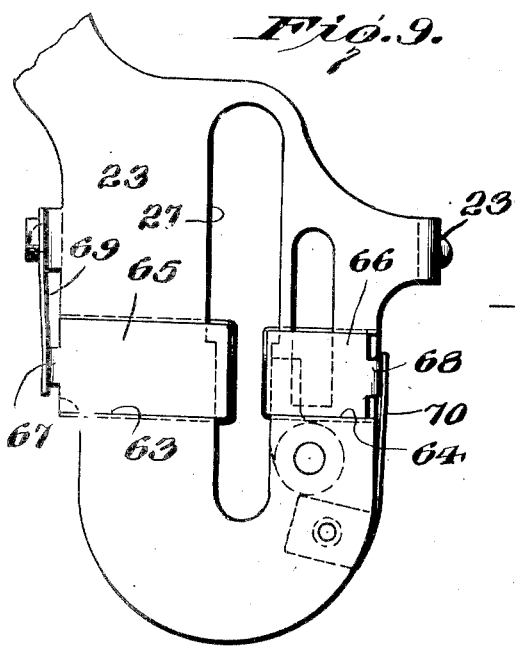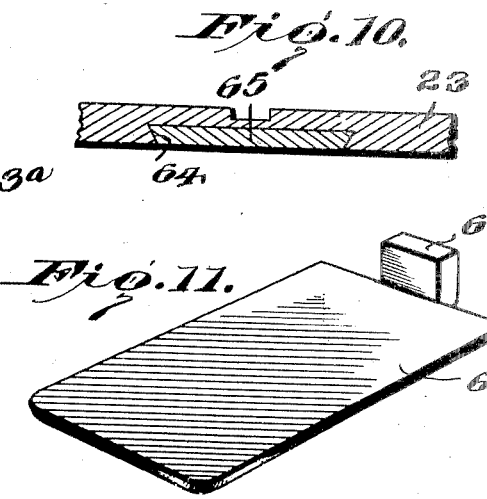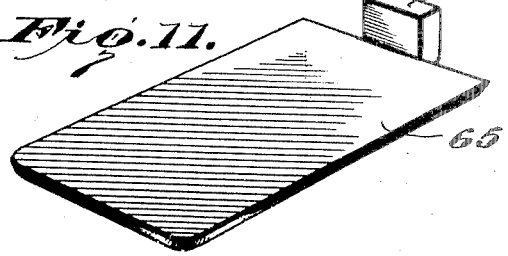

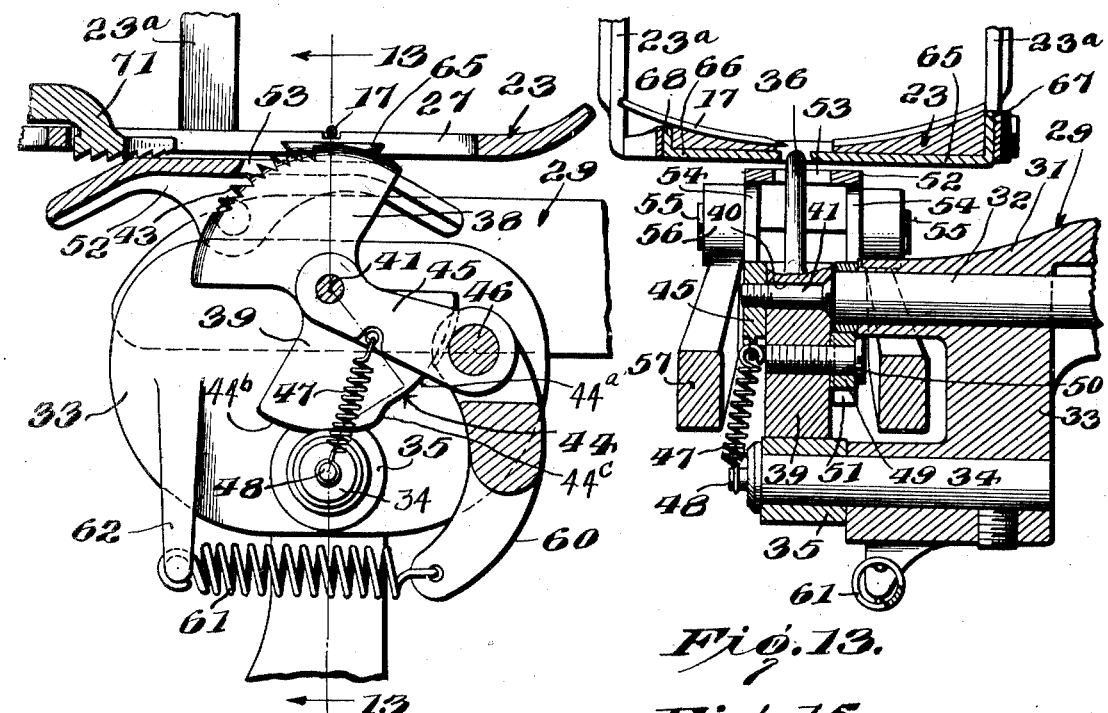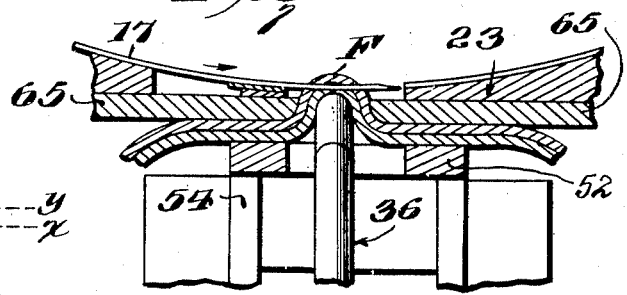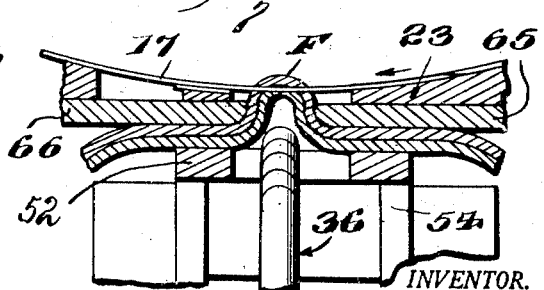

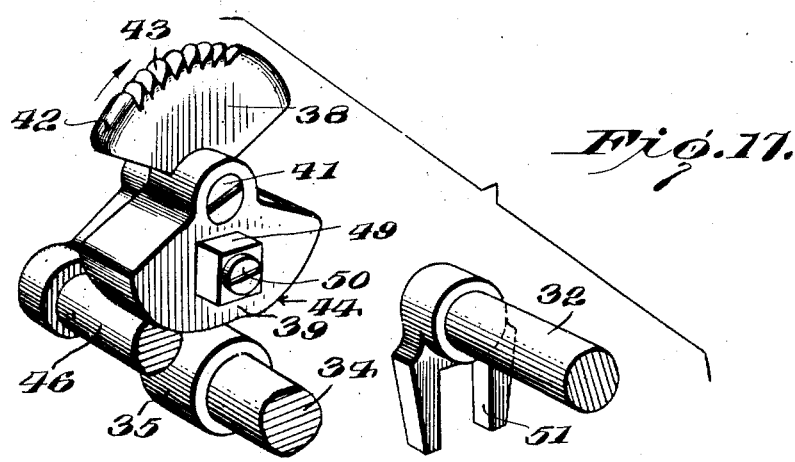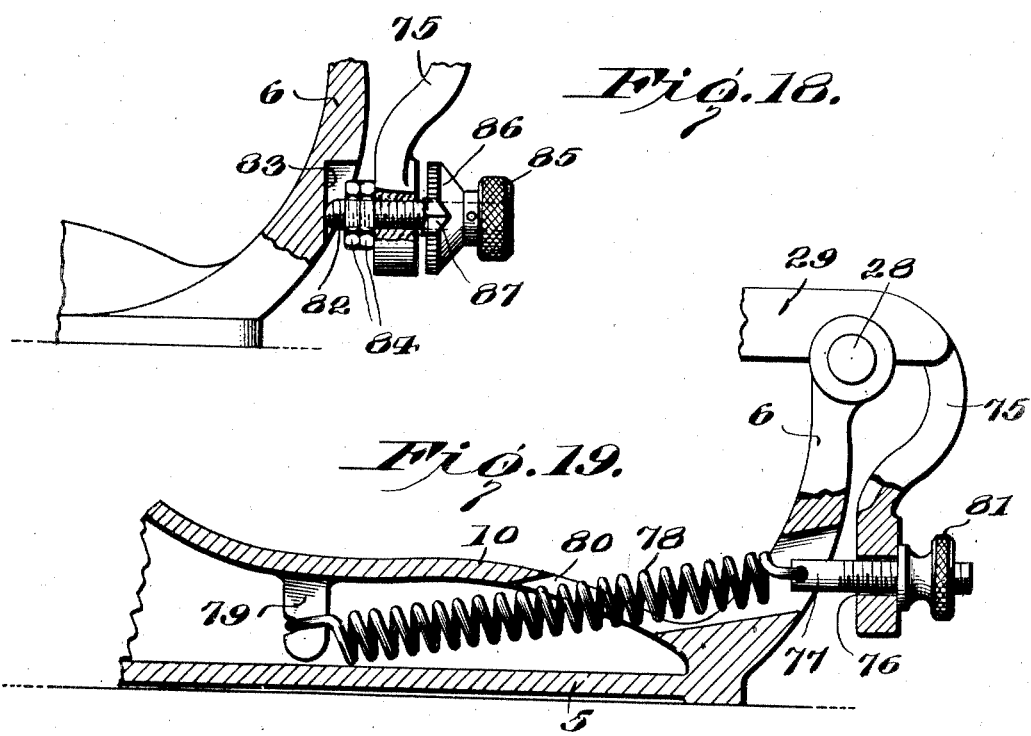

Patented Dec. 10, 1929

1,739,081

UNITED STATES PATENT OFFICE

CHARLES W. MUELLER, OF ST. LOUIS, MISSOURI, ASSIGNOR TO LEWIS INVISIBLE STITCH MACHINE COMPANY, OF ST. LOUIS, MISSOURI, A CORPORATION OF MAINE

BLINDSTITCH SEWING MACHINE

Application filed October 15, 1927. Serial No. 226,398.

This invention relates to new and useful improvements in blind stitch sewing machines of that type which are adapted for use in felling operations generally.

Among the several objects of the invention are to provide an oscillatory ridge forming disc and an actuating mechanism therefor including a rock shaft which is separate from the disc supporting means whereby the load on the disc will not be directly transmitted to the rock shaft; to provide means for bodily raising the disc during its forward oscillating stroke to form a ridge of material for subsequent engagement by the needle, and to bodily lower the disc during the backward oscillation to avoid the disc imparting a drag to the fabric, to provide yieldable means for cooperation with the disc to maintain the ridge of material taut and thereby hold the material against the thrust of the needle; to provide means for supporting the presser foot whereby the working plane of the latter may be readily adjusted to meet different working conditions; to provide a spring retained work support which is pivoted in front of the presser foot whereby said support may be swung downwardly in rear of its pivot and away from the foot for the purpose of permitting the work to be readily removed whenever desired; to provide means for adjusting the normal or working position of the work support relative to the presser foot, and to provide a frame of a construction which will insure maximum room for the work and which will greatly eliminate the danger of the work contacting with the main operating parts of the machine.

With these and other objects in view which will more fully appear, the nature of the invention will be more clearly understood by following the description, the appended claims, and the several views illustrated in the accompanying drawings.

In the accompanying drawings which illustrate one form of my invention,

Figure 1 is a top plan view of a sewing machine constructed in accordance with my invention, Figure 2 is a front elevation thereof, Figure 3 is a left hand elevation of the machine, part of the cover being broken to better disclose the looper bar and the top feed lever, Figure 4 is a detailed cross-sectional view taken on the line 4—4 of Figure 3, Figure 5 is a detailed side elevation showing the means for detachably connecting the presser foot to the frame, Figure 6 is an enlarged top plan view showing the means for supporting and actuating the ridge forming disc, and the work clamp, Figure 7 is a detailed top plan view showing the relation between the presser foot, the material, and the ridge forming disc, the disc being shown in its highest position at the time the needle is about to enter the fabric, Figure 8 is a similar view in which the fabric has been removed, Figure 9 is a bottom plan view of the presser foot, Figure 10 is a detailed cross-sectional view taken on the line 10—10 of Figure 8, Figure 11 is a perspective view of one of the fabric engaging fingers, Figure 12 is an enlarged sectional view taken in the line of feed and showing the means for supporting and actuating the ridge forming disc and also showing the relation between the disc, the presser foot and the fabric engaging finger, Figure 13 is a vertical sectional view taken on the line 13—13 of Figure 12, Figure 14 is a detailed sectional view taken in the line of feed showing the means for oscillating the ridge forming disc during its up and down movements, the parts in full lines showing the disc at the forward end of its feed stroke and the dotted lines showing the disc at the rear end of its feed stroke, Figure 15 is an enlarged cross-sectional view showing more or less diagrammatically the relative positions of the presser foot, the fabric, the fabric engaging fingers, work clamp and the ridge forming disc when said disc is at the forward end of its feed stroke and at its highest elevation, the needle having just entered and emerged from the ridge of material, Figure 16 is a similar view but showing the positions of the parts when the disc is at the backward end of its feed stroke and at its lowermost position, the needle beginning its return stroke, Figure 17 is a perspective view of the ridge forming disc, its support and its actuating means, certain of the parts being separated to better disclose the mechanism, Figure 18 is a detailed sectional view showing the adjustable stop for the work support, Figure 19 is a sectional view showing the adjustable spring connection between the work support and frame, and Figure 20 is a detail view showing the means for oscillating the disc operating shaft.

Like reference numerals designate corresponding parts throughout the several figures of the drawings.

Referring to the accompanying drawings, my improved sewing machine includes a frame A which comprises a base 5 having a standard 6 extending upwardly along the front edge of the base, a post 7 which extends upwardly from the rear right hand corner of the base, a horizontal arm 8 which extends laterally from the upper end of the post 7 and overhanging the left hand edge of the base 5, and a horizontal arm 9 which extends forwardly from the overhanging end of the arm 8, the forward end of the arm 9 terminating at a point considerably in rear of the standard 6. The horizontal arms 8 and 9 are hollow and the supporting post 7 is likewise hollow. This post 7 curves forwardly at its lower end and forms a raised and hollow rib like structure 10 which extends forwardly to the standard 6, as shown in Figures 1, 2 and 3. The left hand side of the rib 10 is curved downwardly as at 11 and merges with the upper flat surface of the base 5.

Journaled in the horizontal arm 8 is a rotary main shaft 12 having a combined driving pulley and hand wheel 13 fixed to the outer right hand end thereof. Journaled in the forwardly extending horizontal arm 9 is an oscillatory needle shaft 14 which is oscillated from the main shaft 12 by a connection 15 of suitable construction. The shaft 14 extends forwardly beyond the end of the arm 9 and fixed to the projecting end is a needle arm 16 to which a curved needle 17 is attached by a clamp 18. Cooperating with the needle 17 to form a line of single thread blind stitches, is a looper 19 which is fixed to a looper bar 20 pivotally supported as at 21 on the arm 9 and actuated from the main shaft 12 by a connection 22.

A stationary presser foot 23 is disposed directly below the needle 17 and also below the looper 19. This presser foot is detachably connected to the arm 9 through the medium of a fork 24 which is formed on the rear end of the presser foot and which cooperates with a threaded stud 25 fixed to the underside of the arm 9, and a clamping nut 26 as shown in Fig. 5. Formed in the presser foot 23 is a slot 27 having its longitudinal axis extending parallel to the needle rock shaft 14 and in a plane at right angles to the path of oscillation of the needle 17. In order to adjust the working position or plane of the foot, I have provided said foot at opposite sides thereof with upwardly extending posts $23^a$—$23^a$, having their upper ends provided with flanges $23^b$—$23^b$ which extend over bearing lugs $23^c$—$23^c$ formed on the arm 9 as shown in Fig. 2. Adjusting screws $23^d$—$23^d$ pass through openings in the flanges and are engaged in threaded openings formed in the lugs. By means of these screws $23^d$ the plane of the presser foot may be readily adjusted. Set screws $23^e$—$23^e$ extend through vertical slots in the arms $23^a$ and have threaded engagement with the lug $23^c$. By releasing both set screws $23^e$ the presser foot may be forced downwardly from its rear or attaching end upon the turning of the adjusting screws $23^d$ in a clock-wise direction, to thereby adjust its plane relative to the horizontal. If it is desired to elevate the foot, the set screws $23^e$ and the adjusting screws are released, the foot swung upwardly about its attaching end by hand pressure exerted under the front end of the foot, and the set screws $23^e$ are then returned or reset.

Inasmuch as the presser foot is rigidly attached at its rear end to the frame, and the work support is pivoted at its front to the main frame and at a point in front of the foot, it will be readily understood that with materials of different thicknesses the working plane of the work support will vary in angular relation to the plane of the presser foot bottom. By reason of the adjusting screws $23^c$ and set screws 24, the working plane of the foot may be adjusted into parallelism with the inclined working plane of the work support. By means of these set screws the presser foot can be readily clamped against movement in any position of adjustment.

Journaled on a horizontal axis 28 at the upper end of the standard 6 is a work support 29 which is normally disposed in a substantially horizontal plane. This work support extends rearwardly of the standard 6 and has a straight rear edge 30 which is disposed in parallelism to the axis 28 and is located in a vertical plane extending at right angles to the needle rock shaft 14 and slightly in rear of the path of needle oscillation. The work support 29 is formed at its left rear corner with a reduced extension 31 which projects towards and under the presser foot 23.

Journaled on the underside of the work support 29 and located in rear of and in spaced relation to the axis 28 thereof is a rock shaft 32. The shaft 32 is oscillated from the main shaft 12 through the medium of a curved pitman $32^a$ which extends downwardly within the post 7, forwardly under the rib 10, through the slot 10ª formed in the front portion of the rib 10, and then upwardly towards said shaft 32. The extension 31 is provided with a depending bearing lug 33 in which the left hand end of the rock shaft 32 is journaled. Secured in a horizontal opening formed in the lug 33 below the shaft 32 is a bearing pin 34 which projects outwardly beyond the left hand side of the lug.

Journaled on the projecting end of the pin 34 is a roller 35 forming a bearing or support for a ridge forming disc which I have indicated as a whole by the numeral 36. The axis of the roller 35 is directly below and in the same vertical plane in which the needle reciprocates. The disc 36 is preferably cut-away as at 37—37 to form two quadrant shaped sections 38 and 39, the former constituting a ridge forming section and the latter a supporting section. The disc 36 is formed with a substantially axial bore 40 having a pivot pin 41 journaled therein. The ridge forming section 38 of the disc is formed with a concentric periphery 42 having one or more teeth 43 formed therein. The supporting section 39 of said disc is provided with a peripheral cam 44. This peripheral cam 44 is formed by two spaced concentric portions 44ª and 44ᵇ of different radii, and a connecting eccentric portion 44ᶜ.

The disc 36 is positioned directly over the roller 35 and the cam 44 has sliding contact therewith. The ridge forming section 38 of the disc is disposed in alinement with the slot 27 of the presser foot and is adapted to project a ridge or node of fabric upwardly into needle penetrating position, and to feed the material rearwardly a stitch length after the needle has withdrawn from the fabric. It is therefore desirable to maintain the axis 41 of the disc 36 in the vertical plane containing the axis of the roller 35 and the path of needle reciprocation. To this end, I have provided a link 45 having one end fixed to the pin 41 and the other end journaled on a bearing pin 46 fixed in the extension 31 of the work support and located in advance of the rock shaft 32. A coil spring 47 has one end connected to the link 45 adjacent the pivot 41 thereof and has its other end connected to a pin 48 extending from the end of the roller bearing pin 34. The spring 47 serves to maintain the ridge forming disc 36 in direct contact with the roller 35.

It will therefore be seen that the ridge forming disc 36 is supported by the roller 35 and that the roller 35 forms an abutment against any downward pressure directed onto the disc; that by reason of the link connection between the disc and the work support, the disc is thereby provided with a floating axis, and that the disc is entirely independent of the rock shaft 32 in so far as the supporting means for the disc is concerned.

In order to oscillate the disc 36, I have provided the cam section 39 thereof with a shoe 49 which is pivotally connected to the section by a pivot screw 50. The rock shaft 32 is provided at its left hand end with a forked rocker arm 51 which has sliding engagement with the shoe 49. Thus when the rock shaft 32 is oscillated the forked arm 51 through the medium of the shoe 49 will oscillate the ridge forming disc 36 about its axis 41. In operation, assume that the disc 36 is in its forward position as indicated by the dotted lines in Figure 14. In this position, the concentric peripheral portion 44ª of the supporting portion 39 is resting on and is in direct contact with the roller 35. The disc is therefore in its lower position as indicated by the line x—x in Figure 14. The disc is then oscillated to the right as viewed in said figure, and the eccentric portion or cam step 44ᶜ engages the roller 35 and bodily lifts the disc to its high position shown by the dotted lines y—y, after which and during the remainder of the oscillating stroke, the disc will be supported on the roller through the medium of the concentric peripheral portion 44ᵇ and the roller. Therefore, as the disc moves rearwardly away from the operator, it is bodily raised to stretch and feed the fabric and to position the fabric at the correct height whereby the needle will penetrate evenly. During the return stroke and while the concentric portion 44ᵇ is still engaged with the roller, the needle will penetrate the node of fabric previously formed as above described. It will thus be seen that the needle is in the material during the return stroke of the disc, and consequently the material will not be dragged by the disc during its return movement. The continued return stroke of the disc will result in the disc being lowered to the line x—x, thereby relieving the tension from the fabric. Thus during the feeding stroke of the disc, the disc will be bodily elevated and during the backward stroke the disc will be bodily lowered.

Cooperating with the under surface of the presser foot 23 is a one-piece work clamp 52 which is formed with a slot 53 through which the ridge forming section 38 of the disc 36 projects. The clamp is provided with depending ears 54—54 which are pivoted by screws 55—55 to the arms 56—56 of a supporting lever 57 having a hub 58 journaled on the bearing pin 46. The arms 56—56 are disposed on opposite sides of the disc 36 and the link 45 and the hub 58 is recessed as at 59 to receive the pivot end of the link 45. The lever 57 includes a downwardly extending arm 60 and to the lower end of this arm is connected one end of a coiled spring 61, the other end of the spring being fixedly connected to a lug 62 which depends from the extension 33 of the work support 29. By means of the spring 61 the work clamp 52 is held yieldingly against the presser foot 23, or when the work is positioned between the presser foot and the clamp, the latter will cooperate with the foot to clamp the work against the presser foot while the ridge is being formed in the material and while the needle is penetrating said ridge.

The pressure exerted by the clamp 52 against the work must not be too great, otherwise a drag in the material will take place during the feeding action. It is desirable to hold the ridge of material against the thrust of the needle during the penetrating stroke thereof, and for this purpose I have provided the following means:

Formed in the under surface of the presser foot is a pair of alined undercut grooves 63 and 64. These grooves are respectively disposed on opposite sides of the disc 36 and of course on opposite sides of the slot 27 of the presser foot. The longitudinal axis of these grooves is located in a plane at right angles to the plane of the disc, and in the vertical plane containing the path of needle reciprocations. Slidably mounted in these grooves are fabric engaging fingers 65 and 66 respectively. Thus the fingers are mounted on the presser foot in a horizontal plane for sliding movements towards and from the disc 36. The outer ends of the fingers are respectively provided with upwardly extending fingers or stops 67 and 68 which cooperate with the side walls of the presser foot to limit the inward movements of the fingers whereby the inner edges of the fingers will be retained in spaced relation a distance a little greater than the width of the ridge forming section 38 of the disc. Consequently, these fingers can not have direct contact with said disc. The disc 36 in its lowermost position, as shown in Fig. 16, is slightly below the bottom of the fingers 65 and 66 and the disc in its highest position, as shown in Fig. 15, is slightly above the upper surface of the fingers 65 and 66. Flat springs 69 and 70 are respectively secured to the opposite walls of the presser foot 23 and engage the respective stops 67 and 68 to yieldably retain the fingers 65 and 66 against outward movement. Consequently, it will be seen that when the disc 36 is elevated during the feeding stroke, the fabric F will be formed into a ridge by the disc and the side walls of the ridge of material will be clamped between the fingers 65 and 66 and the disc 36 thereby holding said ridge of material firmly against the thrust of the needle during the penetrating stroke thereof. When the disc partakes of its backward or idle stroke of oscillation, said disc will be bodily lowered to the position shown in Fig. 16 and as indicated in dotted lines in Fig. 14. During this backward stroke, by reason of the bodily downward movement of the disc, all backward drag on the material will be eliminated.

When felling two or more layers of material, the feed disc 36 has a tendency during its feed stroke to feed the under layer faster than the upper layer and to overcome this objection, I have employed a top feed mechanism which includes a top feed dog 71 which operates on the top layer of the fabric within the slot 27 of the presser foot and directly in rear of the disc 36. This top feed dog 71 is carried by an actuating lever 72 which is fulcrumed on the arm 9 of the frame sliding pivot 73 and is driven from the main rotary shaft 12 by a suitable connection 74. The top feed operation is similar to that disclosed in the Dearborn Patent 814,026, Mar. 6, 1906.

In order to yieldably retain the work support 29 in a substantially horizontal plane, and also to provide means for adjusting the plane of the work support relative to the presser foot, I have provided the following mechanism:

The work support 29 is provided at its forward edge with a depending arm 75 which is disposed in front of the standard 6 of the frame, as shown in Fig. 19. The arm 75 is formed with an opening 76 for receiving an adjusting screw 77. A coil spring 78 has one end connected to the rear end of the screw 77 and the other end connected to a lug 79 which extends downwardly from the rib 10 of the frame. The spring 78 passes through an opening 80 formed in the rib 10. An adjusting nut 81 is threaded onto the outer or forward end of the screw 77 and by means of this nut the tension of the spring 78 and consequently the tension on the work support 29 may be readily adjusted. The spring 78 and adjusting screw 77 are disposed on the right hand side of the frame, as shown in Figs. 1 and 2, and the forward portion only of the spring is exposed to view, consequently this spring is located at the farthest possible point away from the stitch forming mechanism. As a result, the work as it is fed through the machine will not contact with the spring.

The arm 75 is also provided with an adjusting screw 82 which has threaded engagement on a threaded opening formed in said arm. The rear end of the screw 82 bears against a flat shoulder 83 formed in the standard 6 and a pair of clamping nuts 84 are threaded onto the rear end of the screw and serve for engagement with the rear face of the arm 75. These lock nuts 84 are fixed on the screw 82 at a predetermined point so as to limit the upward swinging movement of the work support relative to the presser foot. Fixed to the outer end of the screw is a knurled nut 85 by means of which the screw may be adjusted relative to the arm 75 and thereby move said arm forwardly and lower the working plane of the work support. The nut 85 is provided with a ratchet 86 for engagement by a spring finger 87 fixed to the arm 75 so as to retain the screw 82 in any position of adjustment.

It is of course to be understood that the details of structure and arrangements of parts may be variously changed and modified without departing from the spirit and scope of my invention.

I claim:

1. In a sewing machine, the combination with a stitch forming mechanism including a reciprocatory needle, of a slotted presser foot, a work support, a toothed ridge forming and fabric feeding disc supported for oscillations on said work support and located in the plane of the slot in the foot, the path of needle reciprocations being in a plane crossing the plane of the disc, and means including a rock-shaft separate from the disc support for oscillating said disc.

2. In a sewing machine, the combination with a stitch forming mechanism including a reciprocatory needle, of a slotted presser foot, a work support, a toothed ridge forming and fabric feeding disc supported for oscillations on said work support and located in the plane of the slot in the foot, the path of needle reciprocations being in a plane crossing the plane of the disc, and means separate from the disc support for oscillating said disc comprising a rock-shaft, and a rock arm fixed to the shaft and having pivotal connection with the disc.

3. In a sewing machine, the combination with a stitch forming mechanism including a reciprocatory needle, of a slotted presser foot, a work support, a toothed ridge forming and fabric feeding disc supported for oscillations on said work support and located in the plane of the slot in the foot, the path of needle reciprocations being in a plane crossing the plane of the disc, said disc support including a roller journaled on the work support and disposed under and in direct contact with the disc, and a link pivotally connected at one end to the axis of the disc and at its other end to the work support, and means including a rock-shaft separate from the disc support for oscillating said disc.

4. In a sewing machine, the combination with a stitch forming mechanism including a reciprocatory needle, of a slotted presser foot, a work support, a toothed ridge forming and fabric feeding disc supported for oscillations on said work support and located in the plane of the slot in the foot, the path of needle reciprocations being in a plane crossing the plane of the disc, said disc support including a roller journaled on the work support and disposed under and in direct contact with the disc, a link pivotally connected at one end to the axis of the disc and at its other end to the work support, and a spring for retaining the disc in direct engagement with said roller, and means including a rock-shaft separate from the disc support for oscillating said disc.

5. In a sewing machine, the combination with a stitch forming mechanism including a reciprocatory needle, of a slotted presser foot, a work support, a toothed ridge forming and fabric feeding disc supported for oscillations on said work support and located in the plane of the slot in the foot, the path of needle reciprocations being in a plane crossing the plane of the disc, said disc support including a roller journaled on the work support and disposed under and in direct contact with the disc, and a link pivotally connected at one end to the axis of the disc and at its other end to the work support, the axes of the roller and disc being located in a vertical plane containing the path of needle reciprocations, and means including a rock-shaft separate from the disc support for oscillating said disc.

6. In a sewing machine, the combination with a stitch forming mechanism including a reciprocatory needle, of a slotted presser foot, a work support, a toothed ridge forming and fabric feeding disc supported for oscillations on said work support and located in the plane of the slot in the foot, the path of needle reciprocations being in a plane crossing the plane of the disc, and means for imparting forward and backward oscillating movements to the disc and for imparting an upward bodily movement and a downward bodily movement to the disc during the respective oscillating movements thereof.

7. In a sewing machine, the combination with a stitch forming mechanism including a reciprocatory needle, of a slotted presser foot, a work support, a toothed ridge forming and fabric feeding disc supported for oscillations on said work support and located in the plane of the slot in the foot, the path of needle reciprocations being in a plane crossing the plane of the disc, said disc support including a peripheral cam on the lower edge of the disc, and a roller journaled on the work support and in direct contact with the disc, and means for oscillating said disc whereby the same will be bodily raised and lowered through said cam and roller during the respective forward and backward oscillating movements thereof.

8. In a sewing machine, the combination with a stitch forming mechanism including a reciprocatory needle, of a slotted presser foot, a work support, a toothed ridge forming and fabric feeding disc supported for oscillations on said work support and located in the plane of the slot in the foot, the path of needle reciprocations being in a plane crossing the plane of the disc, said disc support including a peripheral cam on the lower edge of the disc, a roller journaled on the work support and in direct contact with the disc, a link pivotally connected at one end to the disc and at the other end to the work support, and a spring for retaining the disc in direct contact with the roller, and means for oscillating said disc whereby the same will be bodily raised and lowered through said cam and roller during the respective forward and backward oscillating movements thereof.

9. In a sewing machine, the combination with a stitch forming mechanism including a reciprocatory needle, of a slotted presser foot, a work support, a toothed ridge forming and fabric feeding disc supported for oscillations on said work support and located in the plane of the slot in the foot, the path of needle reciprocations being in a plane crossing the plane of the disc, said disc support including a peripheral cam on the lower edge of the disc, and a roller journaled on the work support and in direct contact with the disc, and means for oscillating said disc whereby the same will be bodily raised and lowered through said cam and roller during the respective forward and backward oscillating movements thereof, said means comprising a shoe pivoted to one face of the disc, a rock-shaft journaled on the work support and having its longitudinal axis in substantial alinement with the axis of the disc, and a forked rock arm fixed to the shaft and having sliding connection with said shoe.

10. In a sewing machine, the combination with a stitch forming mechanism including a reciprocatory needle, of a slotted presser foot, a work support, a toothed ridge forming and fabric feeding disc supported for oscillations on said work support and located in the plane of the slot in the foot, the path of needle reciprocations being in a plane crossing the plane of the disc, means for oscillating said disc, and a pair of yieldable fabric engaging fingers supported on the presser foot on opposite sides of the disc and disposed in a vertical plane containing the path of needle reciprocations.

11. In a sewing machine, the combination with a stitch forming mechanism including a reciprocatory needle, of a slotted presser foot, a work support, a toothed ridge forming and fabric feeding disc supported for oscillations on said work support and located in the plane of the slot in the foot, the path of needle reciprocations being in a plane crossing the plane of the disc, means for oscillating said disc, a pair of fabric engaging fingers supported on the presser foot on opposite sides of the disc for sliding movements in a horizontal plane towards and from said disc, and springs for yieldingly holding the fingers against outward sliding movements.

12. In a sewing machine, the combination with a stitch forming mechanism including a reciprocatory needle, of a slotted presser foot, a work support, a toothed ridge forming and fabric feeding disc supported for oscillations on said work support and located in the plane of the slot in the foot, the path of needle reciprocations being in a plane crossing the plane of the disc, means for oscillating said disc, said presser foot having alined and undercut grooves formed in its under face on opposite sides of the slot and in the vertical plane containing the path of needle reciprocations, a pair of fabric engaging fingers slidably mounted in the grooves of the foot for movements towards and from said disc, stops fixed to the outer ends of the fingers for cooperation with the sides of the foot to limit the inward movements of said fingers, and springs for yieldingly holding the fingers against outward sliding movements.

13. In a sewing machine, the combination with a stitch forming mechanism including a reciprocatory needle, of a slotted presser foot, a work support, a toothed ridge forming and fabric feeding disc supported for oscillations on said work support and located in the plane of the slot in the foot, the path of needle reciprocations being in a plane crossing the plane of the disc, means for imparting forward and backward oscillating movements to the disc and for imparting an upward bodily movement and a downward bodily movement to the disc during the respective oscillating movements thereof, and yieldable means supported on the presser foot and cooperating with the disc to retain the ridge of fabric taut during the forward and upward movement of the disc.

14. In a sewing machine, the combination with a stitch forming mechanism including a reciprocatory needle, of a slotted presser foot, a work support, a toothed ridge forming and fabric feeding disc supported for oscillation on said work support and located in the plane of the slot in the foot, the path of needle reciprocations being in a plane crossing the plane of the disc, means for imparting forward and backward oscillating movements to the disc and for imparting an upward bodily movement and a downward bodily movement to the disc during the respective oscillating movements thereof, and yieldable means for retaining the ridge of fabric taut during the forward and upward movement of the disc comprising a pair of fabric engaging fingers supported on the presser foot on opposite sides of the disc for sliding movements in a horizontal plane towards and from said disc, and springs for yieldably holding the fingers against outward sliding movements.

15. In a sewing machine, the combination with a stitch forming mechanism including a reciprocatory needle, of a slotted presser foot, a work support, a toothed ridge forming and fabric feeding disc supported for oscillations on said work support and located in the plane of the slot in the foot, the path of needle reciprocations being in a plane crossing the plane of the disc, said disc support including a peripheral cam on the lower edge of the disc, said cam comprising spaced concentric portions of different radii and an intermediate eccentric portion, and a roller journaled on the work support and in direct contact with the disc, and means for oscillating said disc whereby the same will be bodily raised and lowered through said cam and roller during the respective forward and backward oscillating movements thereof.

In testimony whereof I hereunto affix my signature.

CHARLES W. MUELLER.